June 26, 1923.

G. ZILOCCKI 1,460,219

DRILLING MACHINE

Filed June 1, 1921

Inventor
Giordano Ziloccki,
By his Attorneys
Edgar Tate

June 26, 1923.

G. ZILOCCKI 1,460,219

DRILLING MACHINE

Filed June 1, 1921

Inventor
Giordano Ziloccki,
By his Attorneys
Edgar Tate & Co

June 26, 1923.

G. ZILOCCKI 1,460,219

DRILLING MACHINE

Filed June 1, 1921

Inventor
Giordano Zilocki
By his Attorneys
Edgar Tate

June 26, 1923.

G. ZILOCCKI 1,460,219

DRILLING MACHINE

Filed June 1, 1921

Inventor
Giordano Ziloccki,
By his Attorneys
Edgar Tate &B.

Patented June 26, 1923.

1,460,219

UNITED STATES PATENT OFFICE.

GIORDANO ZILOCCKI, OF GRANTON, NEW JERSEY, ASSIGNOR OF THIRTY PER CENT TO MARINO A. MONZIONE, OF NORTH BERGEN, NEW JERSEY.

DRILLING MACHINE.

Application filed June 1, 1921. Serial No. 474,058.

*To all whom it may concern:*

Be it known that I, GIORDANO ZILOCCKI, a citizen of Italy, and residing at Granton, in the county of Hudson and State of New Jersey, have invented certain new and useful Improvements in Drilling Machines, of which the following is a specification, such as will enable those skilled in the art to which it appertains to make and use the same.

This invention relates to drilling machines or machines adapted for use in drilling or boring holes, tapping holes and for reaming holes, and the object of the invention is to provide a machine of the class specified with an adjustable chuck head provided with a plurality of chuck supporting devices and with means whereby one of the chuck supporting devices and a chuck mounted thereon may be rotated while the other chuck supporting devices assume an inoperative position; a further object being to provide two separate means for adjusting the chuck head toward and from the table of the machine; and with these and other objects in view the invention consists in a machine of the class and for the purpose specified which is simple in construction and operation and efficient in use, and which is constructed and operated as hereinafter described and claimed.

The invention is fully disclosed in the following specification, of which the accompanying drawings form a part, in which the separate parts of my improvement are designated by suitable reference characters in each of the views, and in which:—

Fig. 3 a side view thereof on a reduced scale;

Figure 1:
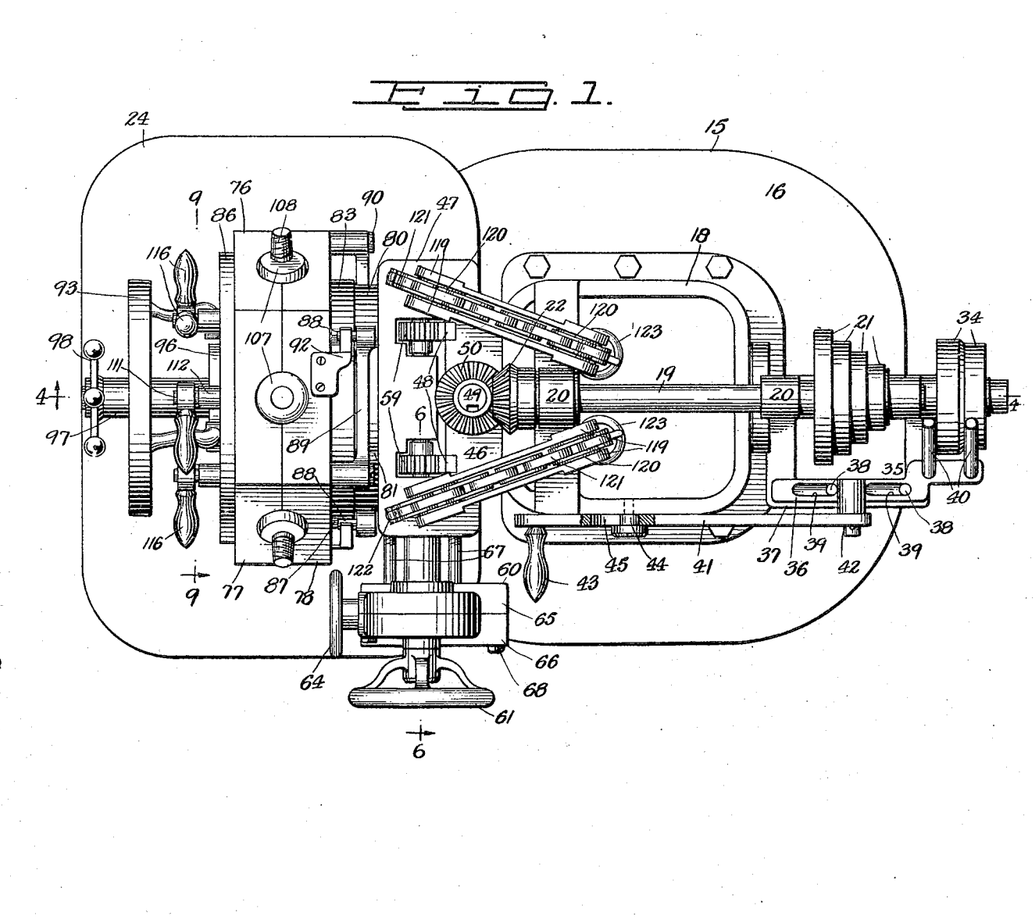
Fig. 1 is a plan view of the complete machine.
Figure 2:
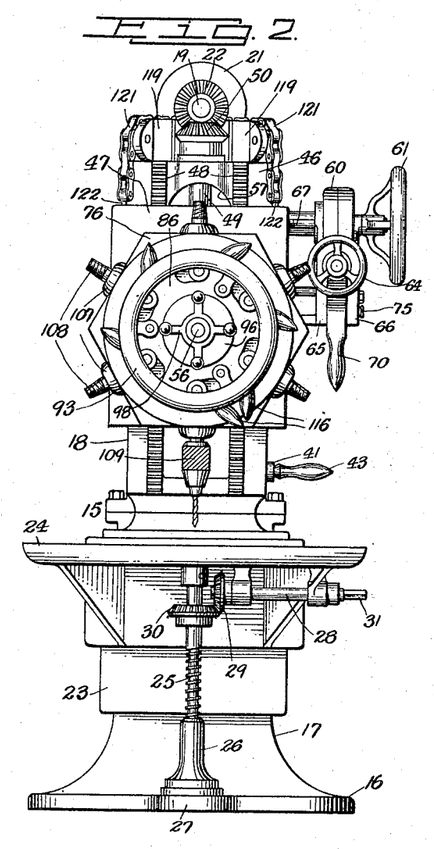
Fig. 2 a front view thereof on a reduced scale.

In Figs. 1, 2 and 3 of the drawings, I have shown my complete drilling machine, and in said figures 15 represents the main frame of the machine, and this frame, in the construction shown, comprises a base 16 and a hollow standard 17, to the top of which is secured a supplemental hollow frame or standard 18 provided at its upper end with a drive shaft 19 mounted on suitable bearings 20 secured to, or forming part of the frame 18, and mounted on one end of said shaft are a plurality of pulleys 21 of different diameters, and at the other end of said shaft is secured a beveled gear 22.

The main frame 15 is provided at its front side with a slide-way 23 in connection with which a table 24 is mounted and capable of vertical movement or adjustment by means of a screw shaft 25 movable inwardly and outwardly through an upstanding bearing 26 mounted upon an extension 27 of the base 16 of the machine, and said screw shaft is rotated by means of a shaft 28 provided at its inner end with a beveled gear 29 cooperating with a similar beveled gear 30 on the upper end of the shaft 25. The outer end of the shaft 28 is square or angular in form as shown at 31, whereby a suitable crank or wheel may be coupled therewith for the purpose of rotating said shaft to adjust the table 24 upwardly or downwardly on the main frame 15.

Mounted at the back of the main frame 15 adjacent to the upper end thereof is a stub shaft 32 having two sets of pulleys 33—34 and, in practice, a belt is passed around the pulleys 33 and the pulleys 21 on the shaft 19 and a drive belt is passed around the pulleys 34 and around a pulley on a power shaft or motor which is not shown in the usual manner in setting up machines of this class. A belt shifting device 35 is adjustably mounted in connection with the supplemental frame 18 and the support for the stub shaft 31 as clearly shown in Figs. 1 and 3, and this device, in the form of construction shown, comprises a sliding plate 36 movably mounted upon a stationary plate 37 having upstanding pins 38 which operate in elongated apertures 39 in the plate 36, and the plate 36 is provided with a pair of projecting fingers 40 in connection with which the belt adapted to pass around the pulleys 34 operates. The plate 36 is adjusted by means of a rod 41 pivoted to a keeper on said plate as shown at 42 and extending forwardly of the machine and provided at its front end with a handpiece 43 and a screw 44 is passed through an elongated aperture 45 in said rod and into the supplemental frame 18.

Figure 10:
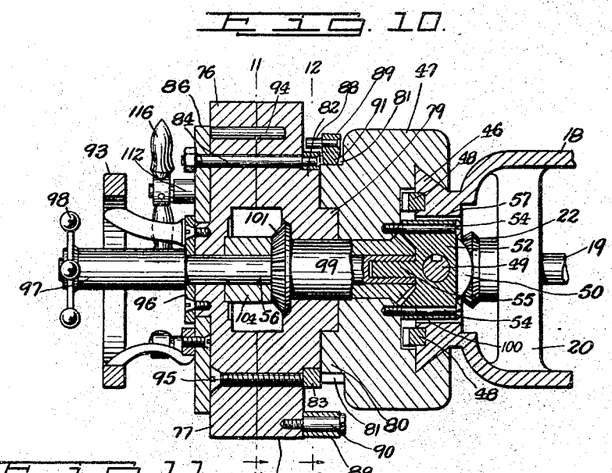
Fig. 10 a partial section on the line 10—10 of Fig. 4.
Figure 11:
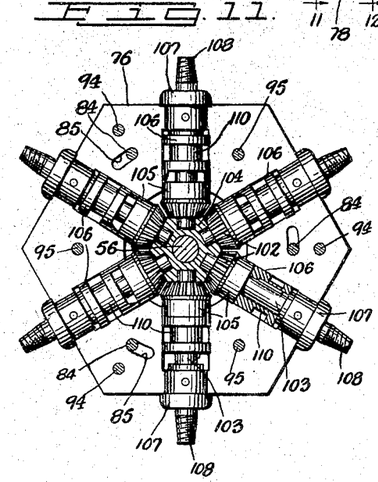
Figs. 11 and 12 are partial sections on the lines 11—11 and 12—12 of Fig. 10.

The front wall of the supplemental frame 18 is provided with a projecting slide-way 46 upon which a carriage 47 is mounted and capable of vertical adjustment, and mounted in the front face of the slide-way 46 at the opposite side portions thereof are two gear racks 48, which project beyond the face of said slide-way as clearly shown in Fig. 10. A vertical shaft 49 is mounted in suitable bearings at the front of the supplemental frame 18, or in the slide-way 46 of said frame, and said shaft is provided at its upper end with a beveled gear 50 which meshes with the beveled gear 22 on the drive shaft 19, as clearly shown in Fig. 4, and another beveled gear 51 is keyed to the shaft 49 and is capable of longitudinal movement on said shaft, and vertical movement in the supplemental frame 18, and said gear is mounted in a box-shaped member 52, the upper end of which is recessed to receive said gear as shown at 53 in Fig. 5 of the drawing, and said box-shaped member is secured to the rear face of the carriage 47 by belts 54, as clearly shown in Figs. 5 and 10. Said box-shaped member is provided with a forwardly directed threaded stud 55 upon which a forwardly directed shaft 56 is mounted as clearly shown in Fig. 4 of the drawing. It will be noted that the gear 51 and the box-shaped member 52 is adapted to move vertically in a cut-out portion 57 in the slide-way 46 of the supplemental frame 18, and this cut-out portion or aperture extends approximately the full length of said frame as clearly shown in Fig. 4.

Figure 5:
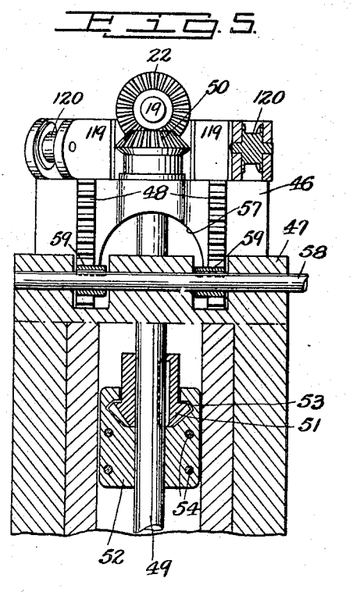
Fig. 5 a partial section on the line 5—5 of Fig. 4.
Figure 6:
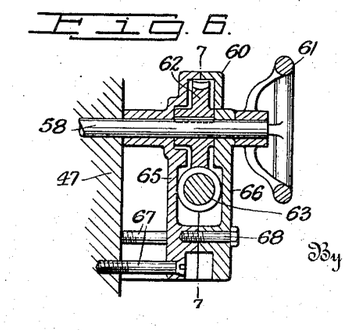
Fig. 6 a partial section on the line 6—6 of Fig. 1.

A shaft 58 is mounted transversely of the top portion of the carriage and is provided with gears 59 which operate in connection with the racks 48, as clearly shown in Fig. 5, and said shaft 58 extends at one side of the machine and passes through a box-shaped device 60 and is provided at its free end with a large hand-wheel 61 by means of which said shaft may be rotated.

Secured to the shaft 58, within the box-shaped device 60 is a worm gear 62 adapted to mesh with a worm 63 mounted in said device below the worm gear 62, and said worm is rotated by a hand-wheel 64 at one end of the box-shaped device 60.

Figure 7:
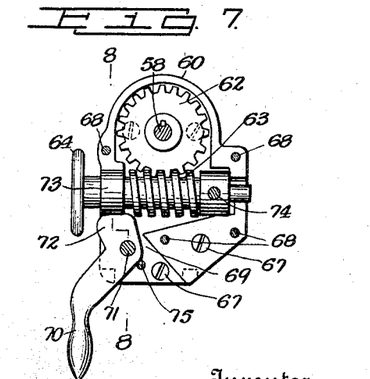
Fig. 7 a partial section on the line 7—7 of Fig. 6.
Figures 7, 8, 9:
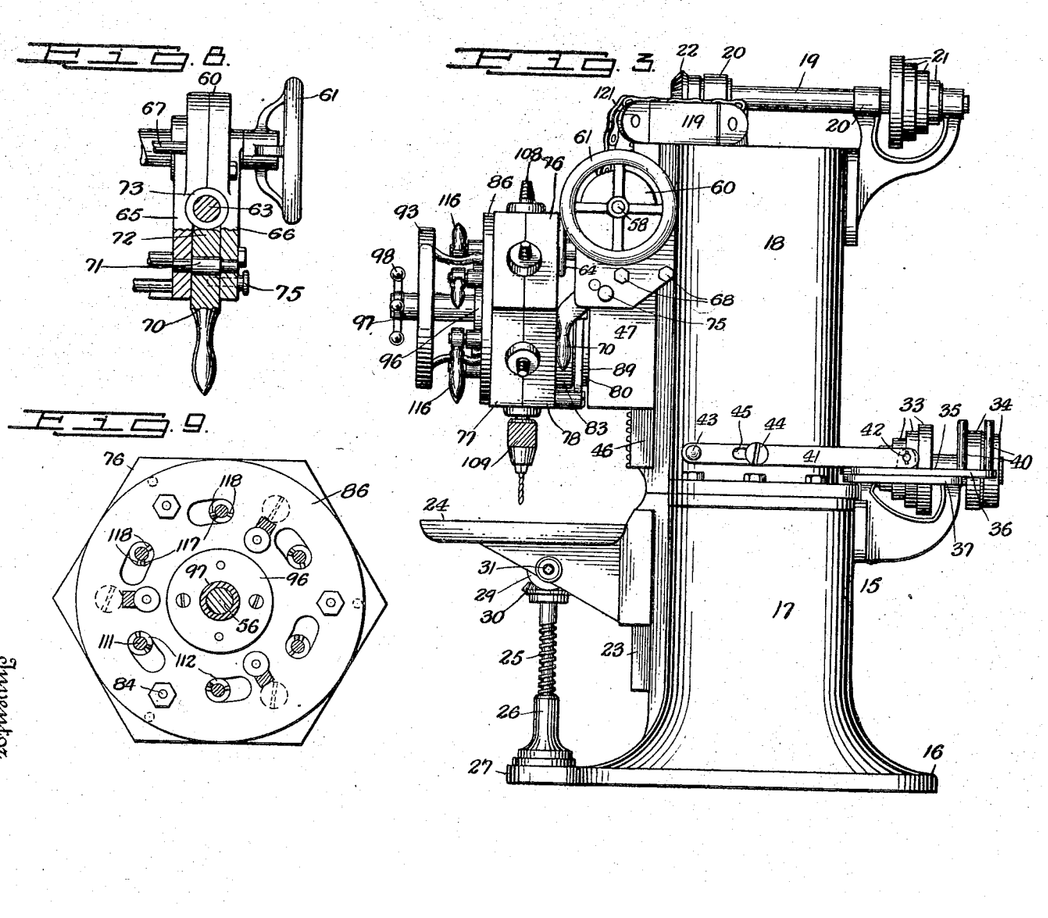
Fig. 8 a partial section on the line 8—8 of Fig. 7.
Fig. 9 a partial section on the line 9—9 of Fig. 1.

The box-shaped device 60 is composed of inner and outer parts 65 and 66, the part 65 being secured to the carriage 47 by screws 67, while the part 66 is secured to the part 65 by screws 68. A recess 69 is formed between the parts 65 and 66 below the worm 63 and a lever 70 is mounted in said recess and pivoted to said parts by a pin or shaft 71, said lever being provided with a cam head 72 which is adapted to operate in connection with a cylindrical portion 73 on the worm 63, as clearly shown in Fig. 7. One end of the worm is pivotally mounted within the box-shaped device 60, or the separate parts 65 and 66 thereof, as shown at 74, and by moving the lever 70 backwardly the worm 63 will drop by gravity on its fulcrum 74, and be disengaged from the worm gear 62. In order to accomplish this result a stop pin 75 must first be withdrawn from the part 66 of the device 60. It will be understood that when it is desired to quickly raise or lower the carriage 47, or to provide quick adjustments thereof, the worm 63 will be dropped out of engagement with the worm gear 62 by manipulating the lever 70, as above set out, and the shaft 58 may then be freely rotated by the hand wheel 61 to accomplish the desired adjustment, but when it is desired to move the carriage 47 upwardly or downwardly, and especially downwardly in the operation of advancing the drill, tap or reamer into a workpiece, the shaft 58 is rotated by means of the worm 63 and worm gear 62, the worm being rotated by means of the wheel 64.

Figure 12:
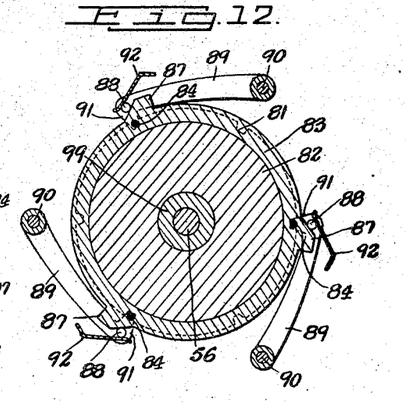

Carried by and adjustably mounted in connection with the carriage 47 is a chuck head 76 which, in the form of construction shown, is composed of separate front and rear parts 77 and 78. The part 78 is provided with a cylindrical portion 79 which fits in a corresponding recess in a cylindrical extension 80 on the front face of the carriage 47, and said cylindrical extension 80 is provided with a plurality of notches or recesses 81. The part 78 of the chuck head is also provided with a cylindrical portion 82, which is larger than the cylindrical portion 79 and an adjustable ring 83 is mounted on the cylindrical portion 82, as clearly shown in Figs. 10 and 12, said ring being secured in position by bolts 84 which pass forwardly through elongated apertures 85 in the parts 78 and 77, and into a disk 86 mounted on the front face of the part 77 and secured to said disk. The ring 83 is provided with a plurality of projecting cam faces 87, which are adapted to operate in connection with pins 88 on the free end portions of the lock arms 89, pivotally mounted in connection with the part 78 of the chuck head by pins 90 as shown in Fig. 10. The lock arms 89 are provided at their free ends with inwardly directed projections 91 adapted to enter the recesses 81 on the cylindrical portion 80 of the carriage 47, and the free ends of the arms 89 are held in operative position by spring devices 92 mounted in connection with the part 78 of the chuck head 76.

From the foregoing it will be seen that by rotating the disk 86 the ring 83 may be rotated to a slight extent to move the lock arms 89 out of engagement with the recesses in the carriage 47 to permit of the adjustment of the chuck head 76 and a large hand-wheel 93 is secured to the face of the disk 86 to permit of this operation.

The separate parts 77 and 78 of the chuck head are secured together by pins 94 and screws 95 respectively as clearly shown in Fig. 10 of the drawing, and the disk 86 is held in position by a smaller disk 96 secured to the part 77 or an extension thereof, and a sleeve 97 is threaded upon the end of the shaft 56 and is adapted to operate in connection with the plate 96 to lock the chuck head, or the various parts thereof, in any desired position of adjustment. The sleeve 97 is provided with a hand-piece 98 to permit of its operation, and it will be understood that in the operation of adjusting the chuck head the sleeve 97 must first be released or withdrawn.

Mounted upon the inner end of the shaft 56 is a sleeve 99, the inner end of which is provided with a beveled gear face 100 adapted to operate in connection with the beveled gear 51, and the outer end of said sleeve is provided with a beveled gear 101 in connection with which a plurality of beveled gears 102 operate. The gears 102 are mounted to rotate freely upon shafts 103, the inner ends of which have a bearing in a block 104 mounted on the shaft 56, and, in the form of construction shown, six of the gears 102 and shafts 103 are employed. The gears 102 are provided with clutch faces 105 in connection with which clutch members 106 keyed to and slidably mounted on the shafts 103 are adapted to operate, and the shafts 103 extend outwardly through the chuck head 76 or other bearings 107 mounted between the separate parts 77 and 78 of said head and are threaded as shown at 108 to receive suitable chuck devices 109, one of which is shown in Figs. 1 and 3 of the drawing.

The clutch members 106 are provided with annular grooves 110 and, in practice, I employ means for moving said clutch devices longitudinally of the shafts 103 into and out of engagement with the clutch faces 105 of the gears 102, and this means, in the form of construction shown, comprises shafts 111 mounted in sleeves 112 secured to the part 77 of the chuck head, said shafts being provided on their inner ends with enlarged heads 113 which carry pins 114 at one side of the center of the shafts 112 and upon which are mounted anti-friction rollers 115 which operate in the annular grooves 110 of the clutch members 106, and by reason of the offsetting of the anti-friction rollers a partial rotation of said shafts 111 will move said clutch members from an operative to an inoperative position or vice versa.

Secured to the outer ends of the shafts 111 are hand-pieces 116, and said hand-pieces, or the cylindrical portions thereof, are provided with backwardly directed projections 117 which are adapted to operate in connection with outwardly projecting members 118 on the sleeves 112 to limit the movement of said hand-pieces, or the rotation of said shafts 111 above set out.

Figure 4:
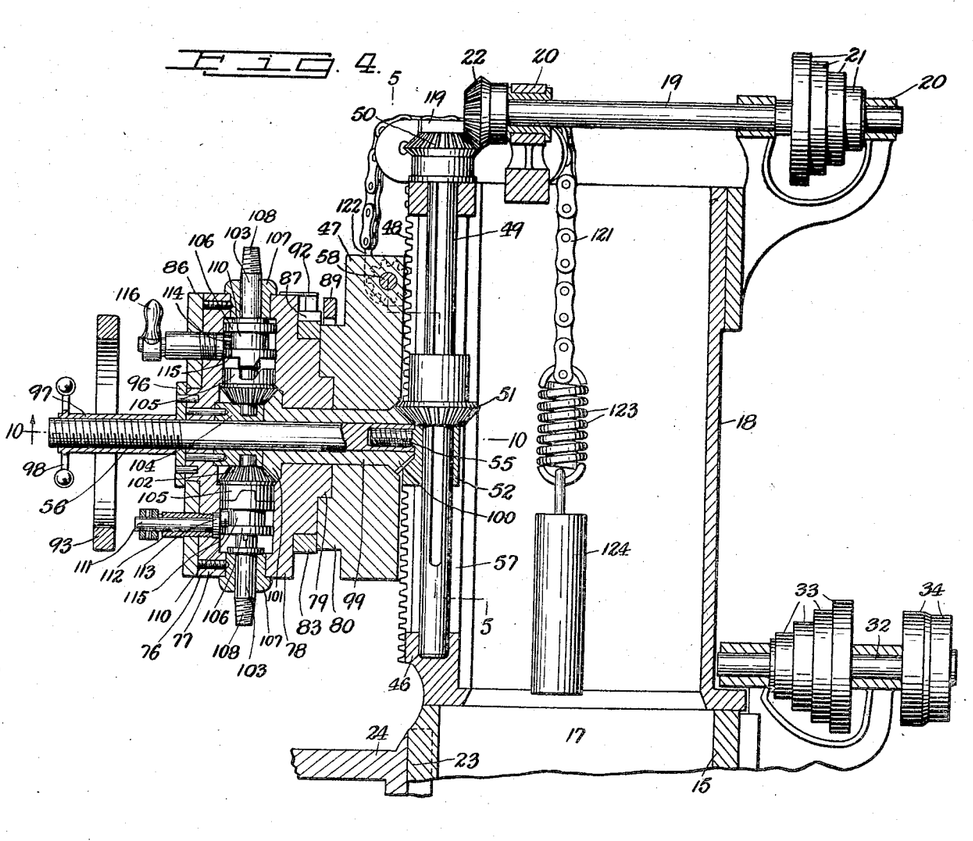
Fig. 4 a partial section on the line 4—4 of Fig. 1.

The top of the supplemental frame 18 is provided at the opposite sides of the front thereof with two pair of up-standing angularly arranged plate members 119 in the front and rear portions of which are rotatably mounted wheels 120, the front wheels being clearly shown in Fig. 5 of the drawing and passed around said wheels are chains 121, one of the ends of each of which are secured to the outer corner portions of the carriage 47 as shown at 122, and connected with the other ends of said chains are springs 123 from which are suspended counter-balance weights 124, and these weights are located within the supplemental frame 18, as clearly shown in Fig. 4, and the object of this construction is to provide a counter-balance for the carriage 47 and the parts mounted in connection therewith, as will be readily understood.

In the use of the machine, it will be apparent that chuck devices similar to that indicated at 109 in Figs. 1 and 3 of the drawing will be mounted in connection with threaded ends 108 of the shafts 103 and drills, taps or reamers may be mounted in connection with said chuck devices, and when it is desired to use one of said drills, taps or reamers for the purpose of drilling, tapping or reaming a workpiece mounted on the table 24, which table is adjusted to the proper position as will be readily understood, the sleeve 97 is first moved outwardly on the shaft 57 to permit of the rotation of the chuck head, the disk 86 is then rotated to a slight extent by means of the hand-wheel 93, which operation correspondingly rotates the ring 83 and the cam members 87 of said ring which operate in connection with the pins 88 on the lock arms 89 will move said arms radially to disengage the projections 91 of said arms from the recesses 81 in the cylindrical portion 80 of the carriage 47. The chuck head 76 may now be rotated by means of the hand-wheel 93 to bring any one of the chuck supporting shafts, or the chuck or desired tool mounted in connection therewith, in a vertical position over the table 24 as indicated in Figs. 1 and 3 of the drawing, after which the hand-wheel 93 is manipulated or rotated to return the ring 83 to its normal position, in which operation the projecting members 91 of the lock arms 89 again enter the recesses 81 in the carriage 47 and the chuck head is locked in position and is ready for use, after the sleeve 97 has been moved inwardly to clamp said chuck head in position.

The next operation is to move the handpiece 116 to rotate the shaft 111, which operation will move the clutch device 106 into operative position, or into engagement with the clutch face 105 on the beveled gear 102 mounted upon the downwardly directed shaft 103. The rotation of the drive shaft 19 in the manner hereinbefore described will rotate the vertical shaft 57 through the gears 22 and 50 and the sleeve 99 on the shaft 56 rotated through the gears 51 and 100, and the gears 102 are rotated through the gear 101, and when the clutch device 106 is moved into operative position the shaft 103 upon which said clutch device is mounted and keyed will also rotate.

The tool supported in the downwardly directed chuck 109 is advanced toward and from a workpiece on the table 24 by means of the hand-wheels 61 or 64 in the manner hereinbefore set out. It will be understood that the chuck head may be adjusted into different positions whenever desired, but only one of the chuck devices mounted in connection therewith is operated at any one time, or in other words only one of the clutch devices 106 is moved into operative position, namely, the clutch device on the shaft which is directed downwardly.

It will be apparent that while I have shown certain details of construction for carrying my invention into effect, that I am not necessarily limited to these details nor to the specific arrangement of parts herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A machine of the class described comprising a suitable frame, a carriage adjustably mounted in connection therewith, a chuck head adjustably mounted on said carriage and carried thereby, a plurality of chuck supporting shafts mounted in said chuck head, clutch devices movably mounted upon said shafts and keyed thereto to permit of the rotation of said shafts in one position of said clutch devices, means extending through said chuck head for actuating said clutch devices, and means involving a plurality of lock arms for interlocking said chuck head with said carriage to retain said chuck head in connection with said carriage in different positions of adjustment.

2. A machine of the class described comprising a suitable frame, a carriage adjustably mounted in connection therewith, a chuck head adjustably mounted on said carriage and carried thereby, a plurality of chuck supporting shafts mounted in said chuck head, clutch devices movably mounted upon said shafts and keyed thereto to permit of the rotation of said shafts in one position of said clutch devices, means extending through said chuck head for actuating said clutch devices, means involving lock arms for interlocking said chuck head with said carriage to retain said chuck head in connection with said carriage in different positions of adjustment, and means for moving said lock arms into inoperative position to permit of the adjustment of said chuck head.

3. A machine of the class described comprising a suitable frame, a carriage adjustably mounted in connection therewith, a chuck head adjustably mounted on said carriage and carried thereby, a plurality of chuck supporting shafts mounted in said chuck head, clutch devices movably mounted upon said shafts and keyed thereto to permit of the rotation of said shafts in one position of said clutch devices, means extending through said chuck head for actuating said clutch devices, means involving lock arms for interlocking said chuck head with said carriage to retain said chuck head in connection with said carriage in different positions of adjustment, means for moving said lock arms into inoperative position to permit of the adjustment of said chuck head, and two flexible members connected with said carriage and provided at their ends with weights for counterbalancing said carriage.

4. A machine of the class described comprising a suitable frame, a drive shaft mounted horizontally of the top portion of the frame, means whereby said shaft may be rotated, a vertical shaft mounted in the front portion of the frame and geared in connection with said first named shaft, two gear racks mounted in the front face of the frame, a carriage slidably mounted in connection with the front of the frame and adapted to be moved upwardly and downwardly thereon, a shaft mounted transversely of said carriage and provided with gears adapted to mesh with said gear racks, means for rotating said shaft to move said carriage upwardly and downwardly on the frame, and a chuck head adjustably mounted in connection with said carriage.

5. A machine of the class described comprising a suitable frame, a drive shaft mounted horizontally of the top portion of the frame, means whereby said shaft may be rotated, a vertical shaft mounted in the front portion of the frame and geared in connection with said first named shaft, two gear racks mounted in the front face of the frame, a carriage slidably mounted in connection with the front of the frame and adapted to be moved upwardly and downwardly thereon, a shaft mounted transversely of said carriage and provided with gears adapted to mesh with said gear racks, means for rotating said shaft to move said carriage upwardly and downwardly on the frame, a chuck head adjustably mounted in connection with said carriage, and means whereby a plurality of chuck devices may be mounted in connection with said chuck head.

6. A machine of the class described comprising a suitable frame, a drive shaft mounted horizontally of the top portion of the frame, means whereby said shaft may be rotated, a vertical shaft mounted in the front portion of the frame and geared in connection with said first named shaft, two gear racks mounted in the front face of the frame, a carriage slidably mounted in connection with the front of the frame and adapted to be moved upwardly and downwardly thereon, a shaft mounted transversely of said carriage and provided with gears adapted to mesh with said gear racks, means for rotating said shaft to move said carriage upwardly and downwardly on the frame, a chuck head adjustably mounted in connection with said carriage, means whereby a plurality of chuck devices may be mounted in connection with said chuck head, and means slidably mounted on said vertical shaft and keyed thereto and in operative connection with the chuck supporting means on said chuck head for rotating said chuck devices.

7. A machine of the class described comprising a suitable frame, a drive shaft mounted horizontally of the top portion of the frame, means whereby said shaft may be rotated, a vertical shaft mounted in the front portion of the frame and geared in connection with said first named shaft, two gear racks mounted in the front face of the frame, a carriage slidably mounted in connection with the front of the frame and adapted to be moved upwardly and downwardly thereon, a shaft mounted transversely of said carriage and provided with gears adapted to mesh with said gear racks, means for rotating said shaft to move said carriage upwardly and downwardly on the frame, a chuck head adjustably mounted in connection with said carriage, means whereby a plurality of chuck devices may be mounted in connection with said chuck head, means slidably mounted on said vertical shaft and keyed thereto and in operative connection with the chuck supporting means on said chuck head for rotating said chuck devices, and clutch devices for controlling the operation of said chuck devices.

8. In a machine of the class described, a chuck head adjustable vertically on the machine and also rotatably adjustable, means for adjusting said chuck head, a plurality of chuck supporting shafts mounted in said chuck head, gear members rotatably mounted upon the inner ends of said shafts and geared in connection with the drive shaft of the machine, said members being provided with clutch faces, clutch members movably mounted on said shafts and keyed thereto and adapted to operate in connection with the clutch faces of said gear members, and rods mounted in said chuck head and projecting therethrough for operating said clutch members to move the same into and out of engagement with the clutch faces of said gear members.

9. In a machine of the class described, a chuck head adjustable vertically on the machine and also rotatably adjustable, means for adjusting said chuck head, a plurality of chuck supporting shafts mounted in said chuck head, gear members rotatably mounted upon the inner ends of said shafts and geared in connection with the drive shaft of the machine, said members being provided with clutch faces, clutch members movably mounted on said shafts and keyed thereto and adapted to operate in connection with the clutch faces of said gear members, rods mounted in said chuck head and projecting therethrough for operating said clutch members to move the same into and out of engagement with the clutch faces of said gear members, and a plurality of lock arms adapted to cooperate with said chuck head to retain the same in different positions of adjustment.

10. In a machine of the class described, a chuck head adjustable vertically on the machine and also rotatably adjustable, means for adjusting said chuck head, a plurality of chuck supporting shafts mounted in said chuck head, gear members rotatably mounted upon the inner ends of said shafts and geared in connection with the drive shaft of the machine, said members being provided with clutch faces, clutch members movably mounted on said shafts and keyed thereto and adapted to operate in connection with the clutch faces of said gear members, rods mounted in said chuck head and projecting therethrough for operating said clutch members to move the same into and out of engagement with the clutch faces of said gear members, a plurality of lock arms adapted to cooperate with said chuck head to retain the same in different positions of adjustment, and manually operated means for moving said lock arms into inoperative positions.

11. A drilling machine comprising a vertical frame, gear racks on the front portion of said frame, a carriage carrying radially arranged spindles slidable on said frame and having pinions engaging said racks, a horizontally arranged shaft having a gear connection with said spindles, a driving shaft mounted horizontally of the top portion of said frame, a vertical shaft within the frame and between the gear racks driven from the driving shaft, a gear rotatably mounted in the carriage and having connection with the horizontal shaft and slidably mounted on the vertical shaft through which the spindles are driven from the driving shaft.

In testimony that I claim the foregoing as my invention I have signed my name in presence of the subscribing witnesses this 28th day of May, 1921.

GIORDANO ZILOCCKI.

Witnesses:
C. E. MULREANY,
H. E. THOMPSON.